Nov. 12, 1940.   W. C. SHIPLEY   2,221,303
EDUCATIONAL DEVICE
Filed March 14, 1939
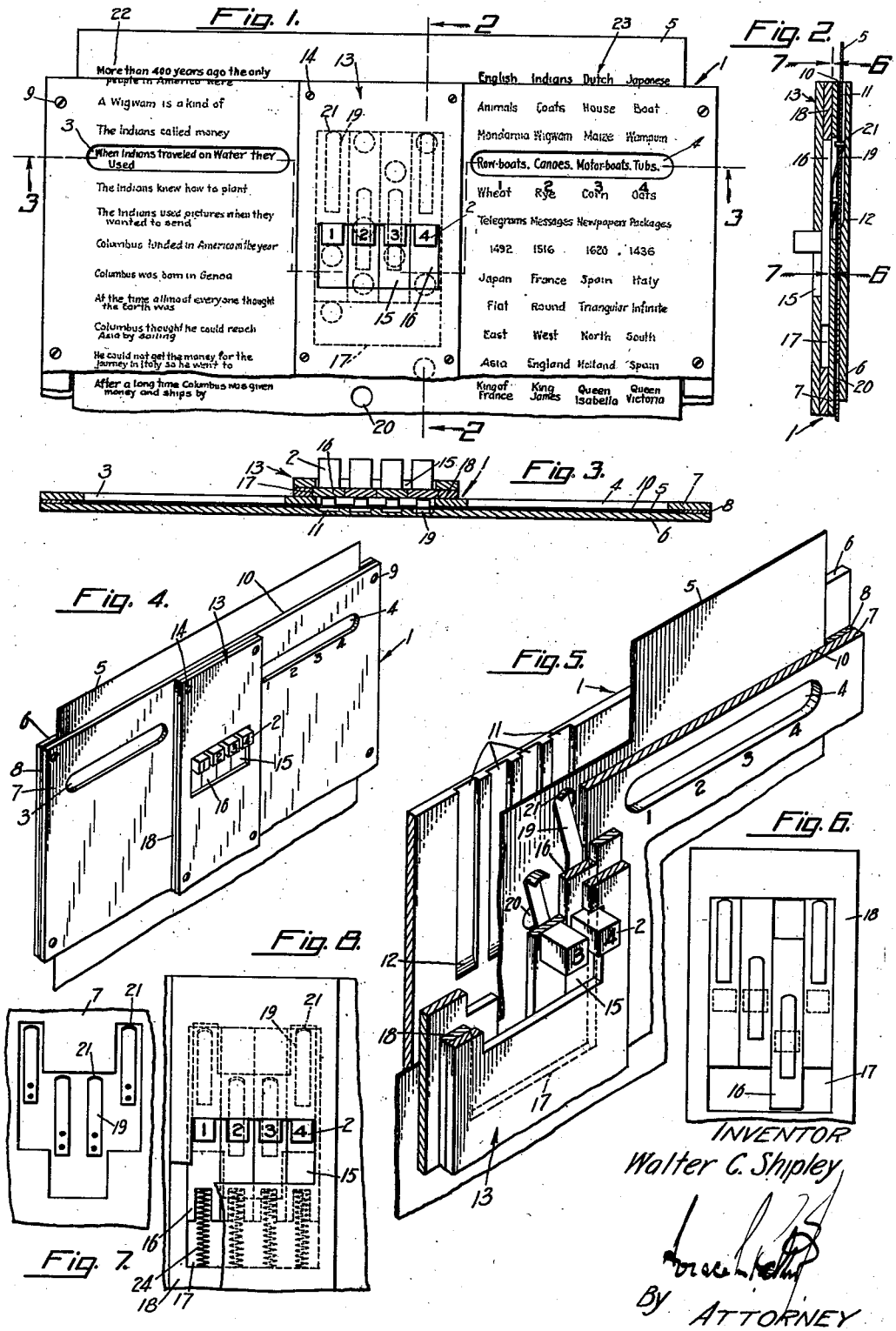
INVENTOR
Walter C. Shipley
By ATTORNEY Patented Nov. 12, 1940

2,221,303

UNITED STATES PATENT OFFICE 2,221,303

EDUCATIONAL DEVICE

Walter C. Shipley, Hartford, Conn.

Application March 14, 1939, Serial No. 261,754

12 Claims. (Cl. 35—48)

My invention relates to educational devices.

It has among its objects to provide an improved educational device of the question and answer type. Other objects of my invention are to provide such a device of an improved and simplified mechanical form and such a device wherein, through an improved construction eliminating all necessity for fixed positions, it is made difficult to defeat the purpose of the device. A further object of my invention is to provide such an improved device having improved means for indicating the correctness of the selected answer by changing the question when the latter is correctly answered. A still further object of my invention is to provide such improved means cooperating in an improved manner with a question sheet. Still another object is to provide such an improved sheet having improved aperture means therein arranged in an improved manner relative to the questions and answers on the sheet, and so disposed as to cooperate effectively with my improved answer selecting means and to enable the latter to be very conveniently disposed and effect sheet movement without cramping as the sheet moves through the device. A still further object of my invention is to provide an improved construction wherein the improved structure is disposed in an improved manner in convenient board form, in such manner as to enable the device to be operated when flat on a table, or when held in the lap or the like, while being very convenient in use and also capable of being readily manufactured at small expense. These and other objects and advantages of my improvements will, however, hereinafter more fully appear.

In the accompanying drawing, I have shown for purposes of illustration two embodiments which my invention may assume in practice.

In the drawing:

Figure 1 is a plan view of the upper portion of one form of my improvement, certain parts being shown in dotted lines and the end of the device toward the user being broken away to facilitate illustration;

Fig. 2 is a vertical section on line 2—2 of Figure 1;

Fig. 3 is a transverse section on line 3—3 of Figure 1;

Fig. 4 is a perspective view of the upper portion of the device;

Fig. 5 is a view similar to Figure 4 but on an enlarged scale, certain parts being broken away to facilitate illustration;

Fig. 6 is a sectional view on line 6—6 of Figure 2;

Fig. 7 is a section on the same line looking in the opposite direction as indicated at 7—7, and Fig. 8 is a view similar to Figure 1, but showing a modified construction.

Referring first to the construction shown in Figures 1 to 7, it will be noted that I have shown an improved board, generally indicated at 1, and having improved question and answer mechanism thereon, including a plurality of parallel longitudinally movable actuating members 2 disposed between question and answer apertures 3 and 4, respectively; improved mechanism being provided whereby when the proper actuating member 2 is operated to indicate the correct answer, an improved question and answer sheet 5 will be actuated, all as hereinafter more fully described.

Referring first to my improved board 1, it will be noted that the same comprises a back plate 6 and a front plate 7. Herein, these plates are slightly wider than the sheet 5 and spaced apart at their side or longitudinal edges by narrow spacing members 8, while being connected by any suitable removable connecting means, as, for example, screws 9. Thus, there is provided between the members 6 and 7, a passage 10 for the sheet 5 wherein the sheet 5 may be readily inserted and also moved lengthwise, herein toward the top of the device, as hereinafter described. Referring to the back plate 6, it will be noted that the inside surface of the same is provided near its top with a series of longitudinally extending grooves 11 disposed parallel to each other, as illustrated, and herein provided with sloping inner ends 12. Further, it will be observed that the front plate 7 herein has the question and answer apertures 3 and 4 formed therein and horizontally disposed, one opposite the other, in such manner as to disclose any suitable question on one side of the sheet 5 in the aperture 3 and a series of possible answers to this question on the opposite side of the sheet 5 in the aperture 4. As shown, a central raised portion, generally indicated at 13, is also provided on the member 7 and extended longitudinally of the latter as desired between the apertures 3 and 4; this portion 13 also being suitably removably attached to the plate 7, as by any suitable removable connecting means 14. Herein, also an actuating opening 15 is provided transversely of the raised portion 13 and at the top thereof, and a series of projecting actuating members or knobs 2, herein four and bearing numbers 1, 2, 3 and 4, is arranged side by side in this opening and longitudinally reciprocable therein.

Improved operating connections are also provided between these members 2 and the sheet 5, whereby the latter is actuated step by step longitudinally in the passage 10 whenever the proper members 2 are operated to select the proper answers, shown in the slot 4, to the questions, shown in the slot 3. Referring more particularly to the members 2, it will be noted that the same are carried upon slides 16 disposed longitudinally of the grooves 11 and slidable on the outher surface of that portion of the plate 7 under the raised portion 13, these slides being movable longitudinally independently relative to one another in an aperture 17, herein formed in a marginal plate 18 enclosing this aperture. As further illustrated in Figures 2, 5 and 7, each of these slides 16 carries on its inner or under surface, a longitudinally disposed spring actuating member 19. Each of these members 19 is suitably connected at one end to its slide and has its other end biased out of contact with the slide and normally pressing against the adjacent face of the sheet 5, in such manner as to be adapted, through its resiliency, to project its free end into a suitable aperture 20 in the sheet 5 whenever its free end is brought into registry with this aperture. Here it will also be observed that when projected through such an aperture 20, as shown in Figure 2, the free end of the spring member 19 is disposed in one of the slots 11, while a lateral extension 21 on the free end of this member engages the wall of the aperture 20 in the sheet 5.

Referring to the sheet 5, it will be observed that the same is of an improved construction, enabling it to cooperate with these members 19 in an improved manner. As shown, the sheet has the questions disposed, as at 22, in spaced relation, one above the other, on the left-hand side of the same, and the various answers are arranged, as shown at 23, one above the other, on the opposite side of the same, while between these series 22 and 23 a series of operating apertures 20 is provided lengthwise of the sheet. Herein, these apertures 20 are so arranged relative to one another and the actuating members 19 that when the proper member 2 is pulled down from the normal position shown in Figure 1, its member 19 will be projected by its own resiliency through its cooperating aperture 20, in such manner that when that member 2 is pushed back, the sheet will be raised as a result of the engagement of extension 21 with the edge of the aperture 20. Herein, also note that two of the members 19 are disposed on their slides 16 in the same longitudinal relation relative to these slides, while the two other members 19, herein the outer two, are differently spaced longitudinally of the slides, herein nearer the top end of the slides. Further, the apertures 20 are so spaced that while no two ever come adjacent each other, all of the same are arranged close to the longitudinal center line of the sheet, in such manner as to minimize cramping of the sheet in the passage 10.

In starting the operation of my improved device, the desired question is exposed in the aperture 3 and the four possible answers thereto are exposed in the aperture 4, these answers being numbered 1, 2, 3 and 4, to correspond with the actuating members 2 which are also numbered 1, 2, 3 and 4. With parts in the position illustrated in Figure 1, no apertures 20 being in the path of the members 19 of actuating members numbered 1, 3 and 4, it is clear that pulling down and pushing up of these actuating members from the normal position thereof shown in Figures 1 and 4, will not cause any movement of the sheet 5; their members 19, instead, simply running back and forth on the inside surface of the sheet 5 which maintains these members 19 pressed inwardly. When, however, the actuating member 2, which is also numbered 2, is pulled down, it will be apparent that the portion 19 thereon will then spring through its aperture 20, which is shown in dotted lines opposite the same in Figure 1. Thus, when this particular member 2 is then pushed up, the upward movement thereof will carry the sheet 5 therewith in such manner as to move the previous question and answers out of the windows 3 and 4 and move the next lower question and series of answers into the windows. With the apertures 20 arranged as shown in dotted lines in Figure 1, the next proper operation will be the operation of the actuating member numbered 3. The next will be the knob marked 2, while the next will be the knob marked 1, the next the knob marked 4, etc. In connection with knobs marked 1 and 4, it will also be noted that these have their portions 19 register with their apertures 20 at different times from the knobs marked 2 and 3 because of the different longitudinal positions of the members 19 on these sets of slides. Here particular attention is directed to the fact that the correct answers to the questions do not come in any preconcerted sequence of operation of the knobs, instead depending upon the arrangement of the apertures in the particular sheet 5 in use. Further, this arrangement may change with each sheet 5. Further, with any given sheet, it is necessary, in order to operate the device, either to answer the questions correctly by operating the correct knob at once or to continue to operate the knobs until the correct one is operated. In practice, the sheet 5 is also printed on both sides so that it may be reversed, the same apertures 20 therein then functioning with a different set of questions.

In Figure 8, I have illustrated a modified construction which is essentially the same as that heretofore described, save that coil springs 24 are disposed under the slides 16, in such manner that the slides are thereby automatically moved upward when released by the operator at the completion of their downward movement. In this construction, obviously the sheet 5 will be moved automatically upward by the springs, rather than pushed upward by the operator when he pushes the button upward.

As a result of my improved construction, it will be observed that it is possible to make the process of learning very interesting and in the nature of a game, while at the same time enabling the structure to be so exceedingly simple as to be very inexpensive. Further, with this construction it is possible to operate the same as fast as desired, with the reward, in the form of movement of the sheet, coming immediately upon selection of the proper answer. Moreover, it will be evident that with the sheet suitably printed on opposite sides, it is possible to double the amount of questions and answers available with a single sheet, at the same time that the cost of providing sheets is reduced by half. These and other objects and advantages of my improved construction will, however, be apparent to those skilled in the art.

While I have in this application specifically described two embodiments which my invention may assume in practice, it will be understood that the same have been chosen for purposes of illustration, and that the invention may be modified and embodied in various other forms without departing from its spirit or the scope of the appended claims.

What I claim as new and desire to secure by Letters Patent is:

1. In an educational device, a sheet enclosing guide, a sheet therein having exposed questions and answers and apertures in said sheet within said guide, and selectively operative devices corresponding to said answers and selectively cooperating with the apertures in said sheet to advance the latter when the correct device is operated.

2. In an educational device, a sheet enclosing guide, a sheet therein having exposed questions and answers and apertures in said sheet within said guide, and selectively operative reversely movable slides on said guide corresponding to said answers and having means for entering one of said apertures when the slide corresponding to the correct answer is moved in one direction and advancing said sheet in said guide when said slide is thereafter moved in the opposite direction.

3. In an educational device, a sheet enclosing guide having question and answer apertures therein, a question and answer sheet in said guide having a series of apertures therein, and selectively operative devices on said guide corresponding to said answers including means cooperating with one of said apertures to move said sheet when the device corresponding to the correct answer is operated.

4. In an educational device, a sheet enclosing guide having question and answer apertures therein, a question and answer sheet in said guide having a series of apertures therein disposed longitudinally of said sheet between the questions and answers thereon, and selectively operative devices on said guide corresponding to said answers and over said apertures in said sheet including means cooperating with one of said apertures to move said sheet when the device corresponding to the correct answer is operated.

5. In an educational device, a sheet enclosing guide having question and answer apertures therein, a question and answer sheet in said guide having a series of apertures therein, and selectively operative devices on said guide corresponding to said answers including reversely movable slides in said guide having means movable over said sheet and receivable in a selected aperture therein when the correct slide is moved in one direction and operative to advance said sheet when said slide is moved in the other direction.

6. In an educational device, a sheet enclosing guide having question and answer apertures therein, a question and answer sheet in said guide having a series of apertures therein, and selectively operative devices on said guide corresponding to said answers including reversely movable slides in said guide having spring connected members movable over said sheet and receivable in a selected aperture therein when the correct slide is moved in one direction and operative to advance said sheet when said slide is moved in the other direction.

7. In an educational device, a sheet enclosing guide having question and answer apertures therein, a question and answer sheet in said guide having a series of apertures therein, and selectively operative devices on said guide corresponding to said answers including reversely movable slides in said guide having means movable over said sheet and receivable in a selected aperture therein when the correct slide is moved in one direction and operative to advance said sheet when said slide is moved in the other direction, certain of said means being differently longitudinally spaced on said slides.

8. In an educational device, a board portion comprising spaced front and back members providing a sheet guide therebetween, said back member having a series of parallel longitudinal slots therein and said front member having transversely aligned question and answer apertures therein, a question and answer sheet between said members and carrying questions and answers successively exposed in said last mentioned apertures, and longitudinally disposed series of actuating apertures between said questions and answers and movable over said slots, and selectively operable devices corresponding to said answers and carried on said front member including means movable through a selected aperture in said sheet and projecting into a selected groove in said back member when the device corresponding to the correct answer is operated.

9. In an educational device, a board portion comprising spaced front and back members providing a sheet guide therebetween, said back member having a series of parallel longitudinal slots therein and said front member having transversely aligned question and answer apertures therein, a question and answer sheet between said members and carrying questions and answers successively exposed in said last mentioned apertures, and longitudinally disposed series of actuating apertures between said questions and answers and movable over said slots, and selectively operable devices corresponding to said answers and carried on said front member including means movable through a selected aperture in said sheet and projecting into a selected groove in said back member when the device corresponding to the correct answer is operated, said devices including reversely movable slides, and said means including spring members carried on the under side thereof and normally pressed back by said sheet.

10. In an educational device, a flat board portion having a sheet passage therethrough and question and answer apertures on opposite sides of the center line of said passage, a question and answer sheet having questions and answers selectively disposable under said apertures and a longitudinally disposed series of apertures between the questions and answers thereon, a raised longitudinally disposed portion on said board between said question and answer apertures, and selectively operable devices mounted in said raised portion and corresponding to said answers including means cooperating with a selected aperture in said sheet for advancing the latter when the device corresponding to the correct answer is operated.

11. In an educational device, a sheet enclosing guide having question and answer apertures on opposite sides thereof, and selectively operable operating devices between said apertures and corresponding to said answers including means for advancing a sheet in said guide when the device corresponding to the correct answer is operated.

12. In an educational device, a sheet enclosing guide having question and answer apertures on opposite sides thereof, and selectively operable operating devices between said apertures and corresponding to said answers including a series of slides and spring means carried thereby for advancing a sheet in said guide when the slide corresponding to the correct answer is operated.

WALTER C. SHIPLEY.